(12) United States Patent
Tandon et al.

(10) Patent No.: US 7,644,116 B2
(45) Date of Patent: Jan. 5, 2010

(54) DIGITAL IMPLEMENTATION OF FRACTIONAL EXPONENTIATION

(75) Inventors: Tarun K. Tandon, San Diego, CA (US); Insung Kang, San Diego, CA (US); Vic Manzella, San Diego, CA (US)

(73) Assignee: VIA Telecom Co., Ltd. (KY)

( * ) Notice: Subject to any disclaimer, the term of this patent is extended or adjusted under 35 U.S.C. 154(b) by 813 days.

(21) Appl. No.: 11/421,425

(22) Filed: May 31, 2006

(65) Prior Publication Data

US 2007/0282936 A1    Dec. 6, 2007

(51) Int. Cl.
    *G06F 7/552* (2006.01)
(52) U.S. Cl. ...................................... 708/277
(58) Field of Classification Search ............... None
    See application file for complete search history.

(56) References Cited

U.S. PATENT DOCUMENTS

| | | | | |
|---|---|---|---|---|
| 4,338,589 A | * | 7/1982 | Engel et al. ............... 341/120 |
| 5,831,878 A | * | 11/1998 | Ishida ........................ 708/277 |
| 6,178,435 B1 | * | 1/2001 | Schmookler ................ 708/277 |
| 6,910,059 B2 | * | 6/2005 | Lu et al. ..................... 708/606 |
| 6,996,591 B2 | * | 2/2006 | Zohar ......................... 708/277 |
| 7,143,126 B2 | * | 11/2006 | Fossum et al. .............. 708/277 |
| 2002/0124034 A1 | * | 9/2002 | Zohar ......................... 708/277 |
| 2009/0037504 A1 | * | 2/2009 | Hussain ...................... 708/277 |

* cited by examiner

*Primary Examiner*—David H Malzahn
(74) *Attorney, Agent, or Firm*—James W. Huffman

(57) ABSTRACT

Provided are digital processing apparatuses and techniques for estimating the fractional exponentiation of the base number 2, i.e., $2^f$ where f is a fractional value. In one representative embodiment, a calculation is made of a folded quantity, which is equal to 1−f if f is greater than a specified threshold and is equal to f otherwise; then, a function of the folded quantity is calculated; and finally, the function of the folded quantity is subtracted from the fraction f and 1 is added. In another embodiment, $2^f$ is approximated by calculating 1+f' in the binary numbering system.

13 Claims, 4 Drawing Sheets

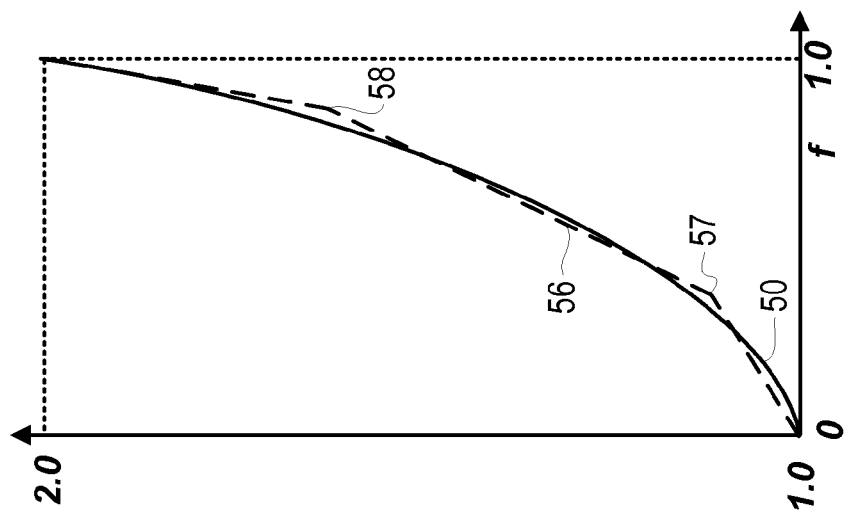
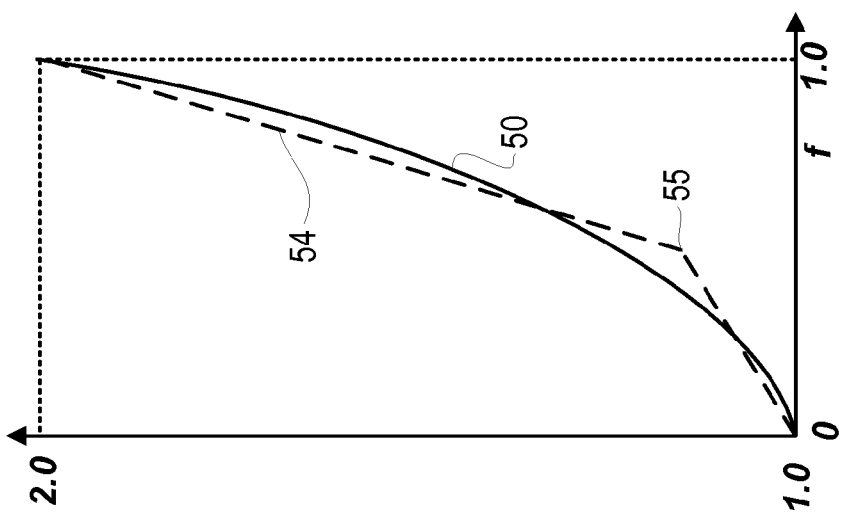
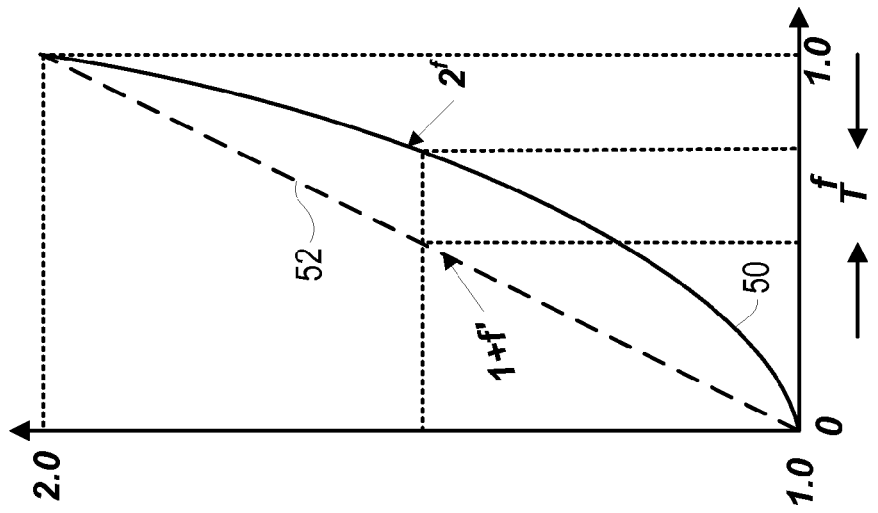

US 7,644,116 B2

DIGITAL IMPLEMENTATION OF FRACTIONAL EXPONENTIATION

FIELD OF THE INVENTION

The present invention pertains to digital systems, and particularly relates to techniques for approximating a fractional power of a base number.

BACKGROUND

Exponentiation is a mathematical operation that involves taking a power of a base number to a specified argument. For example, if the base number is represented by B, then performing an exponentiation operation on it with an argument X would involve computing the number Y such that $Y=B^X$. Both the base number B, and the argument Y, can take on values with integer and fractional parts. For a digital implementation, a binary base typically is used (i.e., B=2). Also, a given argument X for any other non-binary base can be transformed into an equivalent binary-base argument by multiplying X with the pre-computed constant $\log_2(B)$, i.e., $$Y=B^X=2^Z, \text{ where } Z=X\cdot\log_2(B).$$

If Z consists of an integer and fractional part, it can be written as Z=I.F, where I represents the integer part and F represents the fractional part. In a binary-base fixed-point notation, the fractional part (.F) equivalently can be written as $f=(F/2^N)$, where N is the number of significant bits used to represent the fractional portion of the number Z. Using this representation:

$$Y=B^X=2^{X\log_2(B)}=2^{I.F}=2^I\cdot 2^f,$$

where f is the fractional part of the number Z in binary format, and is always $0 \leq f < 1.0$.

The exponentiation of the integer portion of the argument I to the binary base can be digitally implemented by simply shifting the binary base left (for positive I) or right (for negative I) by I number of bit positions. The digital implementation for the exponentiation of the fractional portion of the argument, f, is not trivial.

In a traditional digital implementation of the exponentiation of a binary base by a fractional argument, f, a look-up table is used to map the corresponding number F (the bit-string representation of f) into the correct value of $2^f$, in the binary representation format being used. Typically, a look-up table with $2^N$ entries is used, where N is the number of bits used to represent the fractional part of the argument in binary format. For example, if the fractional part of the argument were represented using 16 bits, the total number of entries in the look-up table would be $2^{16}$=65,536 words (64 KWords). Alternatively, another common method to implement $2^f$ is to digitally compute (1+f), which is a first-order approximation to the correct value, having an irreducible maximum approximation error of approximately 0.5 dB.

Clearly, both solutions are deficient, albeit for different reasons. Therefore, there exists a need for new digital implementations of fractional exponentiation, e.g., which do not require the use of a look-up table and/or results in a more precise approximation value.

SUMMARY OF THE INVENTION

The present invention addresses this problem by providing digital processing apparatuses and techniques for estimating the fractional exponentiation of the base number 2. Specifically, by using piecewise linear approximations and/or utilizing certain specific processes, the estimation can be made computationally efficient.

Thus, in one aspect the invention is directed to a digital processing apparatus configured to approximate a fractional exponentiation of the base number 2. An input section is configured to obtain a fraction f that is expressed in a binary numbering system, and a processing section, coupled to the input section, is configured to approximate $2^f$ by implementing the following calculations in the binary numbering system. First, a calculation is made of a folded quantity, which is equal to 1–f if f is greater than a specified threshold and is equal to f otherwise. Then, a function of the folded quantity is calculated. Finally, the function of the folded quantity is subtracted from the fraction f and 1 is added.

In another aspect, the invention is directed to a method of approximating a fractional exponentiation of the base number 2. The method could be detailed in the following steps: (a) inputting a fraction f represented in base 2 by N bits; (b) inputting the N–1 least-significant bits of the fraction f into an inverter; (c) inputting a value of the most-significant bit of the fraction f into a multiplexer to select either (i) the N–1 least-significant bits of the fraction for (ii) the inverted N–1 least-significant bits of the fraction f output from the inverter, thereby obtaining a selected quantity; (d) inputting the most-significant bit 81 of the fraction f and the selected quantity into an adder, thereby obtaining a folded quantity; (e) inputting the folded quantity into a truncator that truncates a specified number of least-significant bits, thereby obtaining a truncated quantity; (f) inputting the truncated quantity into a thresholding component that takes a minimum of the truncated quantity and a specified value $E_{max}$, thereby obtaining a value of E; and (g) inputting E and the fraction f into a subtractor that computes f–E, and then appending a most-significant bit of 1 to an output of the subtractor, thereby obtaining an approximation of $2^f$.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIGS. 3A-C illustrate comparisons of 1+f' against $2^{f'}$ for three different respective definitions of f'.

DESCRIPTION OF THE PREFERRED EMBODIMENT(S)

The present invention provides a simple method of digitally approximating the value of base 2 raised to a fractional exponent with relatively high accuracy, and can be implemented so as to not require any look-up table at all, thereby offering significant savings in resource utilization. In addition, this technique is applicable to exponentiation of any other non-binary base as well, simply by using a pre-computed scaling factor on the exponent, as described above.

Figure 1:
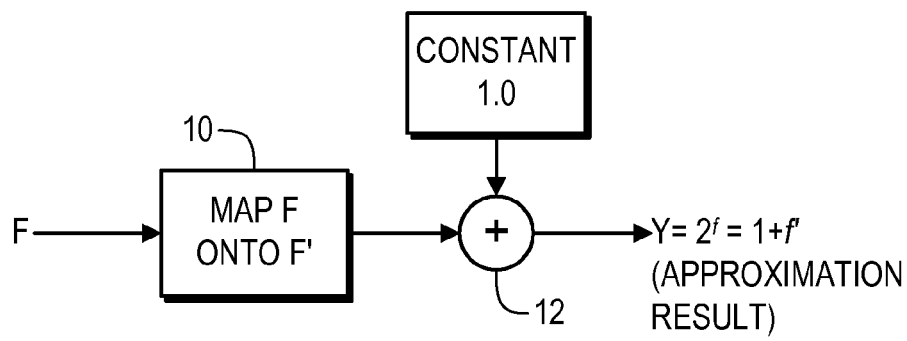
FIG. 1 is a block diagram illustrating the basic approach to calculating a base 2 fractional exponentiation according to representative embodiments of the present invention

As shown in FIG. 1, in representative embodiments of the invention, the digital exponentiation operation $2^f$ is approximated with a digital implementation of (1+f'), where the correct value of f' to minimize the $2^f$ approximation errors is found by manipulating the bits (F) representing the fractional exponent, f. Initially, in module 10, F (the bit-string representation of f) is transformed to a bit string F' (which corresponds to f'). In module 12, the output is combined with the binary representation of 1 (typically with some format modification) to produce the approximation result of 1+f'.

Figure 2:
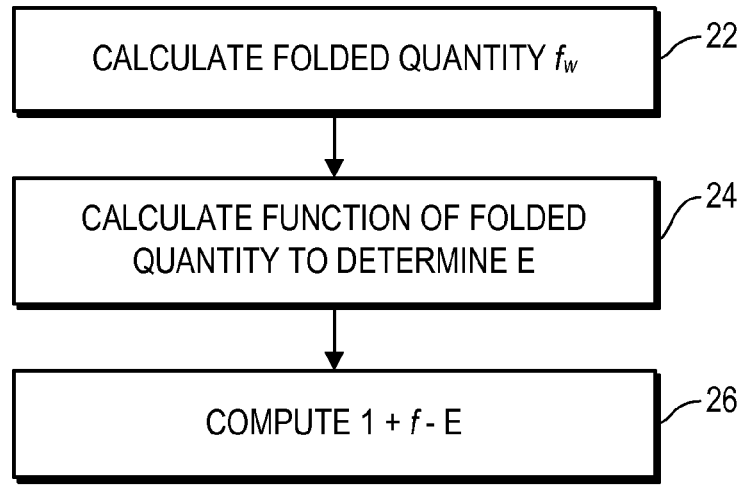
FIG. 2 is a flow diagram for explaining how to estimate a fractional exponentiation of base 2, according to a representative embodiment of the present invention.

In the preferred embodiments of the invention, the value of F' is found by offsetting the given fractional exponent f by a value T such that the value computed by (1+f−T) is close enough to the true value of $2^f$ for that value of f. In other words, the offset value, T, is basically the difference in argument values, f' and f, such that (1+f') is a close approximation of $2^f$. The preferred technique for estimating T from the given value of the fractional argument f is now described with reference to FIG. 2.

Initially, in step 22 a "folded" quantity $f_w$ is calculated. In the preferred embodiments, $$f_w = \begin{cases} f & \text{if } f < Th \\ 1-f & \text{if } f \geq Th \end{cases},$$

where the threshold Th preferably is ½.

In step 24, a function of the folded quantity $f_w$ is calculated in order to determine a quantity E. In the preferred embodiments, $$E = \min\left\{\frac{f_w}{4}, E_{\max}\right\},$$

with $E_{max}$ discussed below. Essentially, E is intended to be an estimate of T. The problem of estimating T is graphically illustrated in FIGS. 3A-C. In this regard, FIG. 3A illustrates a comparison of a curve 52 (defined by 1+f') against a curve 50 (defined by $2^f$) where f'=f. As will be readily observed, T is quite large in the middle portion of the interval for this definition of f'.

FIG. 3B illustrates a comparison of a curve 54 (defined by 1+f') against curve 50 (again defined by $2^f$), but in this case with f'=f−$f_w$/4, and where the threshold Th is ½. As will be readily appreciated, curve 54 is piecewise linear. Due to the definition of f', curve 54 has a slope of ¾ for 0<f<0.5 and a slope of 5/4 for 0.5<f<1. By virtue of this adjustment, curve 54 provides a much closer approximation to curve 50. At the same time, as will be discussed in more detail below, the adjustment can be performed digitally in a very efficient manner.

Finally, FIG. 3C illustrates a comparison of a curve 56 (defined by 1+f') against curve 50 (again defined by $2^f$), where f'=f−E, and where the threshold Th again is ½. As can be readily appreciated, curve 56 also is piecewise linear, but in this case has an initial slope ¾, followed by a slope of 1, and then a slope of 5/4, with the change points 57 and 58 being defined by $E_{max}$. It can be shown that the optimal value of $E_{max}$ (i.e., the one that minimizes approximation errors) is 0.0784 (in floating-point decimal format). This value preferably is converted to the equivalent N-bit digital format by multiplying by $2^N$. The digital value of $E_{max}$ can be pre-computed from the specified number of bits N to be used in a given implementation. For example, using decimal integer notation:

| | |
|---|---|
| If Bit-width of F = 8, | $E_{max}$ = 20 |
| If Bit-width of F = 10, | $E_{max}$ = 80 |
| If Bit-width of F = 12, | $E_{max}$ = 321 |
| If Bit-width of F = 16, | $E_{max}$ = 5138 |
| If Bit-width of F = 20, | $E_{max}$ = 82208 |
| If Bit-width of F = 24, | $E_{max}$ = 1315334 |

By selecting $E_{max}$ as indicated above, curve 54 provides an even closer approximation to curve 50. At the same time, as will be discussed in more detail below, this adjustment also can be performed digitally in a very efficient manner.

More preferably, the value of $E_{max}$ is found analytically using the MinMax (minimizing the maximum error) method of balancing errors, such that the positive approximation errors, i.e., (1+f−$E_{max}$) in segments of the curve where the approximated values are higher than the true values are equal to the absolute value of the negative approximation errors, i.e., ($E_{max}$−1−f) in segments of the curve where the approximated values are lower than the true values. For the case of the $2^f$ function with a fractional value of f, the optimal value of $E_{max}$ has been mathematically computed to be 0.0784. Then, for a given bit width $N_b$ used to represent the fraction f in a digital implementation, the digital value of $E_{max}$ can be found by: FLOOR[$2^{N_b}$*(0.0784)+0.5]. The digital values of $E_{max}$ so found for some of the $N_b$ values are listed in the preceding paragraph, in order to provide some examples.

Referring back to FIG. 2, in step 26 the value of $2^f$ is approximated as 1+f−E.

It is noted that upon completion of the foregoing technique, the resulting approximation can be adjusted to take account of any integer portion (I) of the exponent by simply left-shifting a number of places indicated by the magnitude of I (assuming I is positive) or, more implicitly, by simply noting a change to the format notation.

Figure 4:
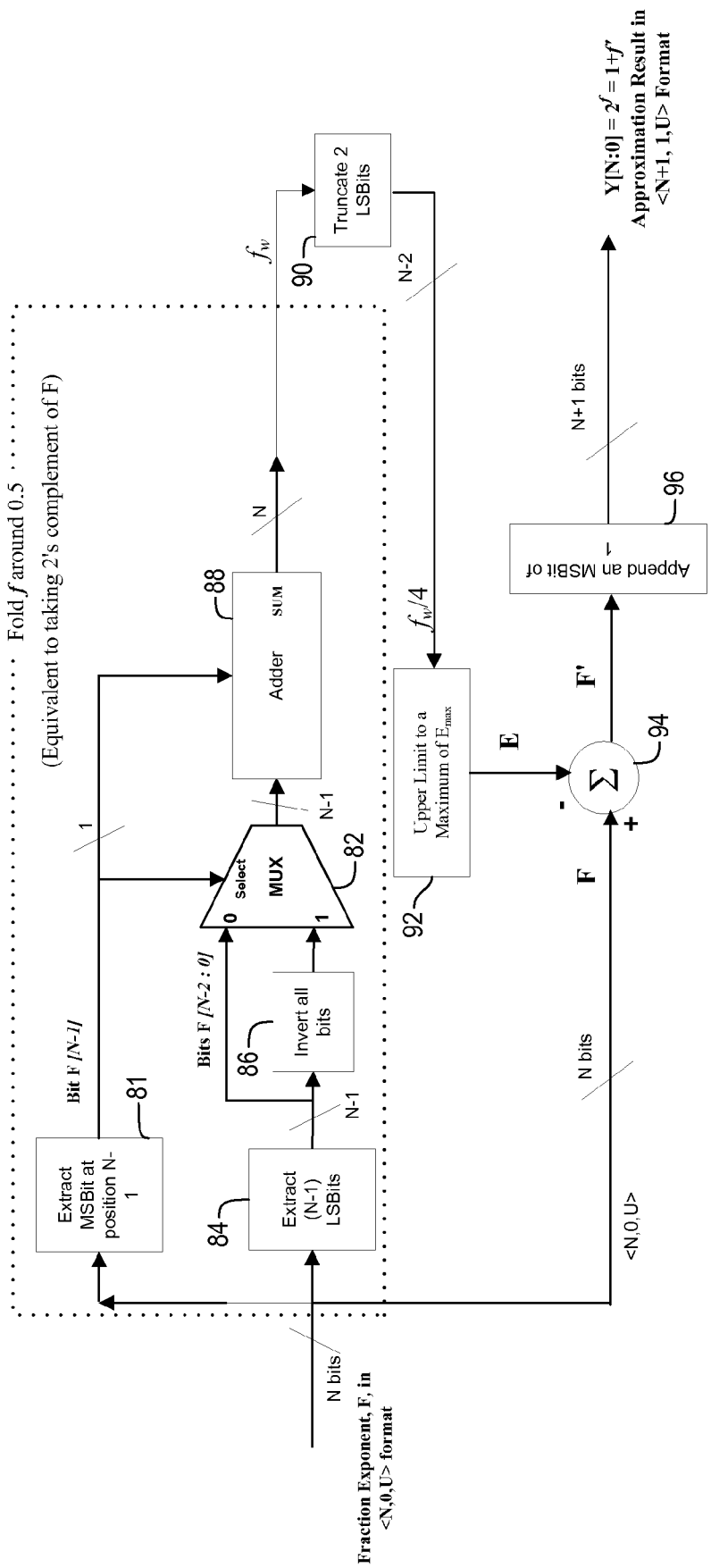
FIG. 4 is a block diagram illustrating a digital implementation of the technique of FIG. 2.

The foregoing technique results in an approximated value for $2^f$ and is highly accurate, with the approximation errors being in the range of 0.05 dB. A specific digital implementation of the foregoing technique is shown in the FIG. 4. Initially, F is input. It is assumed that F is digitally represented by N bits in <N, 0, U> format. In FIG. 4 and in this discussion, a fixed-point format notation of <x,y,z> indicates a total of x bits used for a fixed-point representation of a number with integer and fractional part, out of which, y number of bits are the bits representing the integer portion excluding any sign bits. The parameter z can be either u which indicates an unsigned number, or t, which indicates a signed number in a two's complement format.

Referring to FIG. 4, in module 81 the most significant bit is extracted from F and is used to select, in multiplexer 82, either the N−1 least-significant bits of F, as extracted in module 84, or the inversion of such bits, as output from inverter 86. It is noted that the most significant bit of F indicates whether f is greater than 0.5. Next, in adder 88, a most-significant bit of 0 is appended, and the bit from extraction module 81 is added to the least-significant position of the output from multiplexer 82. That is, a 1 is added only if the inverted bits were selected, with the addition of 1 thereby completing the 1−f subtraction.

In module 90, the two least-significant bits are truncated (corresponding to division by 4). It is noted that this division (as well as any other division by an integer power of 2) can be performed by truncating the appropriate number of bits or right-shifting the quantity the appropriate number of places. Also, the right-shifting may be performed explicitly or, alternatively, may be performed more implicitly by simply modifying the format of the binary quantity. The specific technique depends upon the desired bit length and the format of other binary quantities with which the subject quantity must be combined.

Next, module 92 caps its input at $E_{max}$, so that the resulting output of module 92 is E. That is, if the value of the input to block 92 is less than the precomputed value $E_{max}$, then the value at the output of block 92 is the same as the value at the input to block 92. On the other hand, if the value at the input to block 92 is greater than the $E_{max}$ value, then the value at the output of the block 92 is $E_{max}$. In other words, assuming the input to block 92 is $f_w/4$, then the output of block 92 would be min $$\left\{\frac{f_w}{4}, E_{max}\right\}$$

Thereafter, in subtractor 94, the value of E that has been output from module 92 is subtracted from the original input bit string F, thereby providing F'. Finally, a most significant bit of 1 is appended to provide 1.F' in <N+1, 1, U> format, which is the desired approximation of $2^f$.

The following are some of the potential advantages of the foregoing technique and structure:

No need to use a look-table to compute the result of an exponentiation operation with a fractional argument (exponent) in a digital domain.

Very low approximation error.

Low implementation complexity, just one binary adder with required precision.

Easily adaptable to any desired precision, i.e., to the number of bits used to represent the fractional exponent. Implementation resource requirements do not increase exponentially with increased precision, as generally would be the case with a look-up-table-based approach.

Applicable to computation of an exponentiation operation to any base and approximation of many other mathematical functions, e.g. trigonometric series approximations.

Example applications: Conversion of a number in log-domain to the linear-domain, approximation of the arctangent function, approximation of square-root of a number.

An exemplary application of the digital exponentiation technique discussed above, in order to approximate $\tan^{-1}(f)$, is now described. A fast and accurate digital implementation for computing the arctangent of a given argument has extensive applicability in various signal-processing algorithms requiring an estimate of the angle from a given slope. Traditional high-speed computations of the arctangent approximation typically use lookup tables, where the given digital value of the argument specifies an address in a digital memory containing an approximation of the angle. The look-up table method is fast but requires a great deal of memory to provide adequate accuracy in the approximated value of the arctangent. However, the digital exponentiation technique discussed above can be readily used to compute accurate arctangent approximations for a given digital fractional argument.

The $\tan^{-1}(f)$ function value for a given fractional arguments where $0 \leq f < 1.0$, is in the range of 0 to $\pi/4$ (~0.7854), and so can be fit into a fractional digital format as well. Note that the $\tan^{-1}(f)$ value for any other quadrant can be easily approximated by appropriate quadrant adjustment of the argument and the approximation result values. The $\tan^{-1}(f)$ value can be approximated by the following computation:

$$\tan^{-1}(f) \cong f \cdot \alpha - (2^f - 1),$$

where $\alpha = 2 \cdot Q(0.8816)$, and $Q(0.8816)$ is the appropriately quantized value of the fractional number 0.8816 in the desired digital precision (number of bits). The number 0.8816 approximates the slope of the line from origin to the intersection point of the curves of $\tan^{-1}(f)$ and $(2^f - 1)$.

Figure 5:
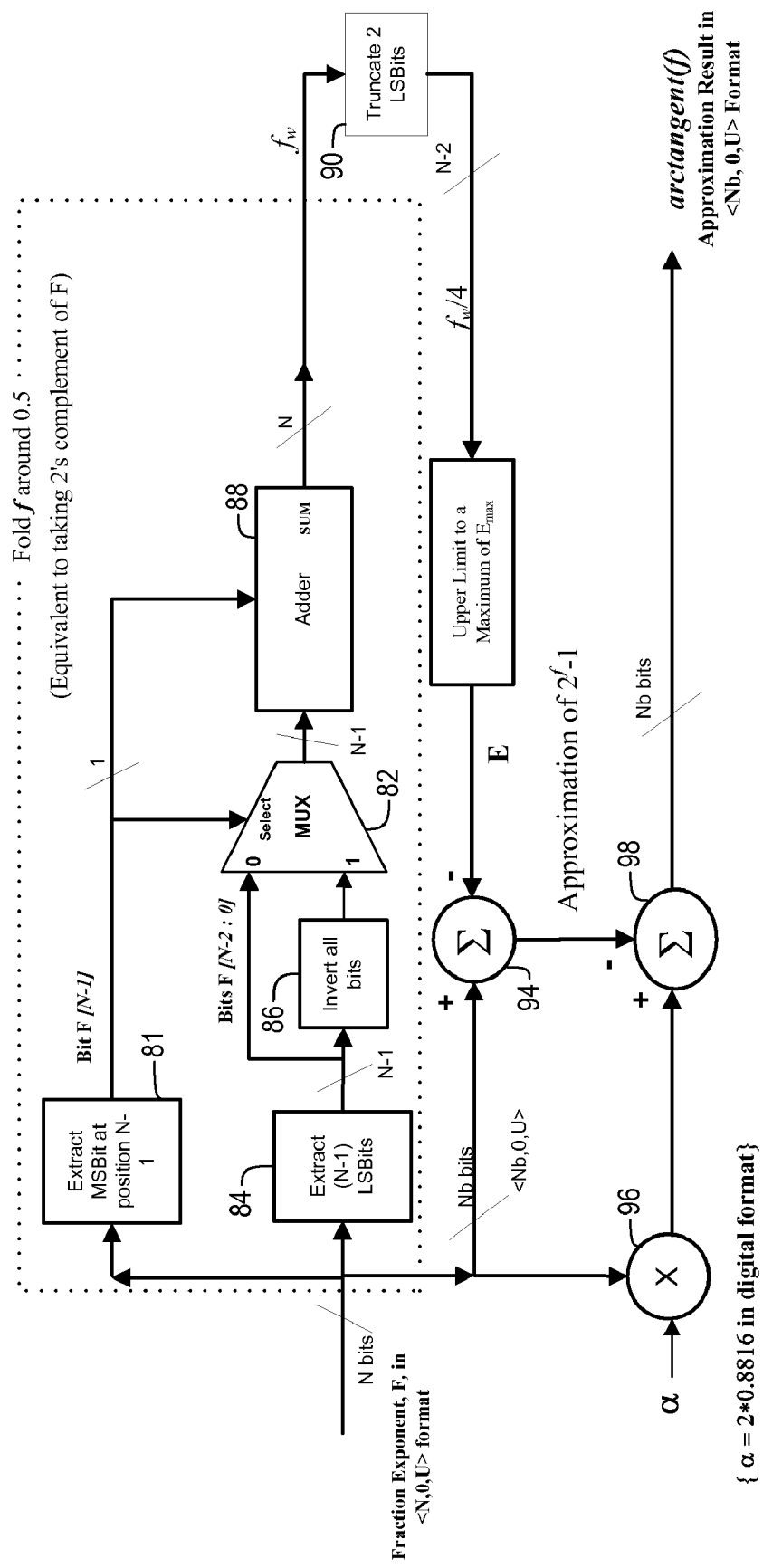
FIG. 5 is a block diagram illustrating a digital implementation for computing the arctangent function.

According to the foregoing representative embodiment of the invention, the $\tan^{-1}(f)$ function is approximated by shifting the $2^f$ curve to origin and mirroring it around the line from the origin to the point where the $2^f$ curve would have intersected the $\tan^{-1}(f)$ curve. FIG. 5 illustrates a digital implementation of the $\tan^{-1}(f)$ function computation using the above-referenced $2^f$ approximation.

As will be readily appreciated, a significant portion of the implementation shown in FIG. 5 is identical to the implementation shown in FIG. 4. Accordingly, the following discussion will focus primarily on the differences.

In multiplier 96, the fractional value f, represented in bit string form as F, is multiplied by the constant $\alpha$. As in FIG. 4, the output from subtractor 94 is F', which is an approximation of $2^f - 1$. In the subtractor 98, this value is subtracted from the output of multiplier 96, resulting in the desired approximation for $\tan^{-1}(f)$.

Figure 6:
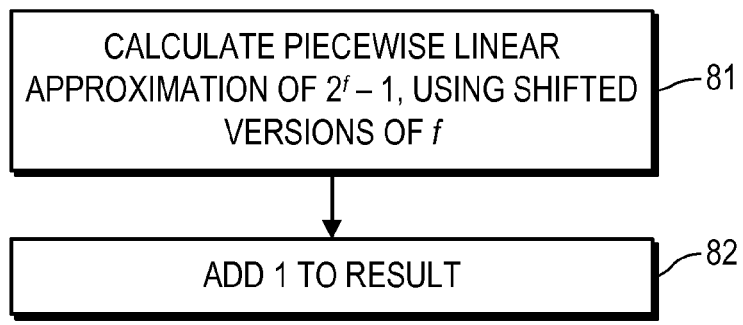
FIG. 6 is a flow diagram for explaining how to estimate a fractional exponentiation of base 2, according to a generalized class of representative embodiments of the present invention.

It is noted that the technique described above for estimating $2^f$ (e.g., in connection with FIGS. 2 and 4) is an example of the more generalized process shown in FIG. 6. That generalized technique is described as follows.

Initially, in step 81 a piecewise linear approximation of $2^f - 1$ is determined. Preferably, each segment has a slope of $$\sum_{j=0}^{J-1} k_j \cdot 2^{-j},$$

where J is an arbitrary positive integer, $k_j$ is $-1$, 0 or $+1$, so that all divisions can be performed by simply shifting, and the total number of nonzero $k_j$, across all segments, is small (e.g., 2-5) so as to limit the complexity of the calculations. The specific breakpoints can be determined by minimizing error, and the calculations can be implemented by simple comparisons, subtractions, additions and shifting. As indicated above, certain simplifications also can be performed by restricting the value of a quantity to a maximum value. In the specific example given above, such a restriction results in a linear segment having a slope of 1.

Finally, in step 82 the result is added to 1 in order to complete the approximation of $2^f$.

According to FIG. 4, a method for use in approximating a fractional exponentiation of the base number 2 of an embodiment in accordance with the present invention could be detailed in the following steps:

(a) inputting a fraction f represented in base 2 by N bits;

(b) inputting the N−1 least-significant bits 84 of the fraction f into an inverter 86;

(c) inputting a value of the most-significant bit of the fraction f into a multiplexer 82 to select either (i) the N−1 least-significant bits of the fraction for (ii) the inverted N−1 least-significant bits of the fraction f output from the inverter 86, thereby obtaining a selected quantity;

(d) inputting the most-significant bit 81 of the fraction f and the selected quantity into an adder 88, thereby obtaining a folded quantity;

(e) inputting the folded quantity into a truncator 90 that truncates a specified number of least-significant bits, thereby obtaining a truncated quantity;

(f) inputting the truncated quantity into a thresholding component 92 that takes a minimum of the truncated quantity and a specified value $E_{max}$, thereby obtaining a value of E; and (g) inputting E and the fraction f into a subtractor 94 that computes f−E.

Then, a most-significant bit of 1 can be appended to an output of the subtractor 94, thereby obtaining an approximation of $2^f$.

Moreover, another method according to the FIG. 5 could be used to approximate an arctangent of a fractional argument expressed in base 2. The method could be further built upon the method according to the FIG. 4, the method for approximating an arctangent further comprising:

(h) inputting an output of the subtractor 94 and a value α*f 96, where α is a predetermined constant, into a second subtractor 98 that computes a difference between α*f and the output of the subtractor 94, thereby obtaining an approximation of arctan(f).

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A digital processing apparatus configured to approximate a fractional exponentiation of the base number 2, comprising:
   (a) an input section configured to obtain a fraction f that is expressed in a binary numbering system; and
   (b) a processing section, coupled to the input section and configured to approximate $2^f$ in the binary numbering system, comprising:
      (i) folding means for calculating a folded quantity, which is equal to 1−f if f is greater than a specified threshold and is equal to f otherwise;
      (ii) function means for calculating a function of the folded quantity; and
      (iii) subtraction means for subtracting the function of the folded quantity from the fraction f and adding 1.

2. A digital processing apparatus according to claim 1, wherein the function means comprises division means for dividing the folded quantity solely by (i) truncating a specified number of least-significant bits of the folded quantity or (ii) right-shifting a specified argument.

3. A digital processing apparatus according to claim 2, wherein the function means further comprises means for limiting an output of the division means to a maximum value.

4. A digital processing apparatus according to claim 3, wherein the maximum value has been selected so as to reduce approximation error, such that positive approximation errors are equal to an absolute value of negative approximation errors.

5. A digital processing apparatus according to claim 2, wherein each of the specified number and the specified argument is less than 5.

6. A digital processing apparatus according to claim 1, wherein the specified threshold is equal to ½.

7. A digital processing apparatus according to claim 1, wherein the processing section further comprises means for estimating an arctangent based on the approximation of $2^f$, and wherein the arctangent is estimated as $\tan^{-1}(f) \cong f \cdot \alpha - (2^f - 1)$, where $\alpha = 2 \cdot Q(0.8816)$ and $Q(0.8816)$ is the appropriately quantized value of 0.8816 in a desired digital precision.

8. A digital processing apparatus according to claim 1, wherein said folding means, function means and subtraction means collectively comprise means for approximating $2^f$ by calculating 1+f' in the binary numbering system, and wherein f' is determined as a piecewise linear approximation of $2^f - 1$ consisting of a plurality of linear segments, with each linear segment having a slope that is defined by $$\sum_{j=0}^{J-1} k_j \cdot 2^{-j},$$

where J is an arbitrary positive integer, each $k_j$ has a value of −1, 0 or +1, and the total number of nonzero $k_j$, across all segments, is less than 5.

9. A method for use in approximating a fractional exponentiation of the base number 2, comprising:
   (a) inputting a fraction f represented in base 2 by N bits;
   (b) inputting the N−1 least-significant bits of the fraction f into an inverter;
   (c) inputting a value of the most-significant bit of the fraction f into a multiplexer to select either (i) the N−1 least-significant bits of the fraction for (ii) the inverted N−1 least-significant bits of the fraction f output from the inverter, thereby obtaining a selected quantity;
   (d) inputting the most-significant bit of the fraction f and the selected quantity into an adder, thereby obtaining a folded quantity;
   (e) inputting the folded quantity into a truncator that truncates a specified number of least-significant bits, thereby obtaining a truncated quantity;
   (f) inputting the truncated quantity into a thresholding component that takes a minimum of the truncated quantity and a specified value $E_{max}$, thereby obtaining a value of E; and
   (g) inputting E and the fraction f into a subtractor that computes f−E.

10. The method of claim 9, further comprising a step of appending a most-significant bit of 1 to an output of the subtractor, thereby obtaining an approximation of $2^f$.

11. The method of claim 9, wherein the specified value $E_{max}$ has been selected so as to reduce approximation error, such that positive approximation errors are equal to an absolute value of negative approximation errors.

12. The method of claim 9, wherein the specified number is less than 5.

13. The method of claim 9, further comprising:
   (h) inputting an output of the subtractor and a value $\alpha*f$, where $\alpha$ is a predetermined constant, into a second subtractor that computes a difference between $\alpha*f$ and the output of the subtractor, thereby obtaining an approximation of arctan(f).

* * * * *